US006064410A

United States Patent [19]

Wen et al.

[11] Patent Number: 6,064,410

[45] Date of Patent: May 16, 2000

[54] PRINTING CONTINUOUS TONE IMAGES ON RECEIVERS HAVING FIELD-DRIVEN PARTICLES

[75] Inventors: Xin Wen, Rochester; Steven D. MacLean, Webster, both of N.Y.

[73] Assignee: Eastman Kodak Company, Rochester, N.Y.

[21] Appl. No.: 09/034,066

[22] Filed: Mar. 3, 1998

[51] Int. Cl.[7] .......................... B41J 2/385; G02B 26/00

[52] U.S. Cl. .......................... 347/111; 359/296; 345/107

[58] Field of Search .......................... 346/21; 347/111, 347/112; 345/85, 107; 430/37; 359/296

[56] References Cited

U.S. PATENT DOCUMENTS

| | | | |
|---|---|---|---|
| 4,588,997 | 5/1986 | Tuan et al. | 347/210 |
| 5,389,945 | 2/1995 | Sheridon | 345/85 |
| 5,708,525 | 1/1998 | Sheridon | 359/296 |
| 5,723,204 | 3/1998 | Stefik | 428/206 |
| 5,866,284 | 2/1999 | Vincent | 430/37 |

*Primary Examiner*—N. Le
*Assistant Examiner*—L. Anderson
*Attorney, Agent, or Firm*—Raymond L. Owens

[57] ABSTRACT

An electronic printing apparatus responsive to a digital image for providing continuous tone optical density pixels forming an output image on a receiver includes a receiver including field-driven particles in a matrix that can change optical density in response to an applied electric field, the field-driven particles being responsive to fields of different amplitude and duration to change the optical density of the pixels formed in the receiver; an array of electrodes associated with the receiver for selectively applying electric fields according to the digital image forming pixels across the receiver; and electronic control circuitry coupled to the array and responsive to the digital images for computing appropriate voltage waveforms having amplitudes and durations selected so that, when the voltage array forms are applied to the array, fields are produced by the array and applied to the receiver to provide continuous tone pixels having optical densities corresponding to pixels in the digital image.

5 Claims, 9 Drawing Sheets

| | T1 | | T2 | | --- | TN | |
|---|---|---|---|---|---|---|---|
| | Tu | A | Tu | A | --- | Tu | A |
| D1 | Tu (1,1) | A(1,1) | Tu (2,1) | A (2,1) | --- | Tu (N,1) | A (N,1) |
| D2 | Tu (1,2) | A(1,2) | Tu (2,2) | A (2,2) | --- | Tu(N,2) | A(N,2) |
| \| | \| | \| | \| | \| | --- | \| | \| |
| \| | \| | \| | \| | \| | --- | \| | \| |
| \| | \| | \| | \| | \| | --- | \| | \| |
| Dmax | Tu (1,max) | A(1,max) | Tu (2,max) | A(2,max) | --- | Tu(N,max) | A(N,max) |

*FIG. 8*

PRINTING CONTINUOUS TONE IMAGES ON RECEIVERS HAVING FIELD-DRIVEN PARTICLES

CROSS REFERENCE TO RELATED APPLICATIONS

Reference is made to commonly assigned U.S. patent application Ser. No. 09/012,842 filed Jan. 23, 1998, entitled "Addressing Non-Emissive Color Reflective Receiver Device" to Wen et al; U.S. patent application Ser. No. 09/035,606 filed Mar. 6, 1998, entitled "Forming Images on Receivers Having Field-Driven Particles" to MacLean et al(77429) and U.S. patent application Ser. No. 09/035,516 filed Mar. 5, 1998, entitled "Heat Assisted Image Formation in Receivers Having Field-Driven Particles" to Wen et al(77488). The disclosure of these related application is incorporated herein by reference.

FIELD OF THE INVENTION

This invention relates to an electronic printing apparatus for producing images on a receiver comprising field-driven particles.

BACKGROUND OF THE INVENTION

There are several types of field-driven particles used in the field of non-emissive displays. One class uses the so-called electrophoretic particle that is based on the principle of movement of charged particles in an electric field. In an electrophoretic receiver, the charged particles containing different reflective optical densities can be moved by an electric field to or away from the viewing side of the receiver, which produces a contrast in the optical density. Another class of field-driven particles are particles carrying an electric dipole. Each pole of the particle is associated with a different optical densities (bi-chromatic). The electric dipole can be aligned by a pair of electrodes in two directions, which orient each of the two polar surfaces to the viewing direction. The different optical densities on the two halves of the particles thus produces a contrast in the optical densities.

To produce a high quality image on a receiver having field-driven particles, it is desirable to produce multiple or continuous tone optical densities at each pixel. Tone scale is particularly important for displaying pictorial images.

SUMMARY OF THE INVENTION

It is an object of the present invention to provide an image having continuous tone optical densities on a receiver having field-driven particles.

This objects is achieved by an electronic printing apparatus responsive to a digital image for providing image pixels of continuous tone optical density in an output image on a receiver, comprising:

a) a receiver including field-driven particles in a matrix, the field-driven particles being responsive to applied electric fields of different amplitude and duration to change the optical density on the receiver;

b) an array of electrodes associated with the receiver for selectively applying electric fields according to the digital image to form image pixels across the receiver; and c) electronic control means coupled to the array and responsive to the digital images for computing properly modulated voltage waveforms selected so that, when the voltage waveforms are applied to the array, fields are produced by the array and applied to the receiver to provide continuous tone pixels having optical densities corresponding to the digital image.

ADVANTAGES

An advantage of the present invention is that the strength of the field applied to the field-driven particles can be varied or modulated to produce multiple optical densities at each pixel of the displayed image.

An additional advantage of the present invention is that the duration of the field applied to the field-driven particles can be modulated to produce variable optical densities at each pixel of the displayed image.

Another advantage of the present invention is that strength and/or duration of the field applied to the field driven particles can be varied according to the temperature of the receiver comprising the field-driven particles to accurately control the optical density on the receiver.

BRIEF DESCRIPTION OF THE DRAWINGS

FIG. 8 shows a calibration look-up table for determining the field strength and duration required to produce a given optical density for each receiver temperature.

DETAILED DESCRIPTION OF THE INVENTION

Figure 1:
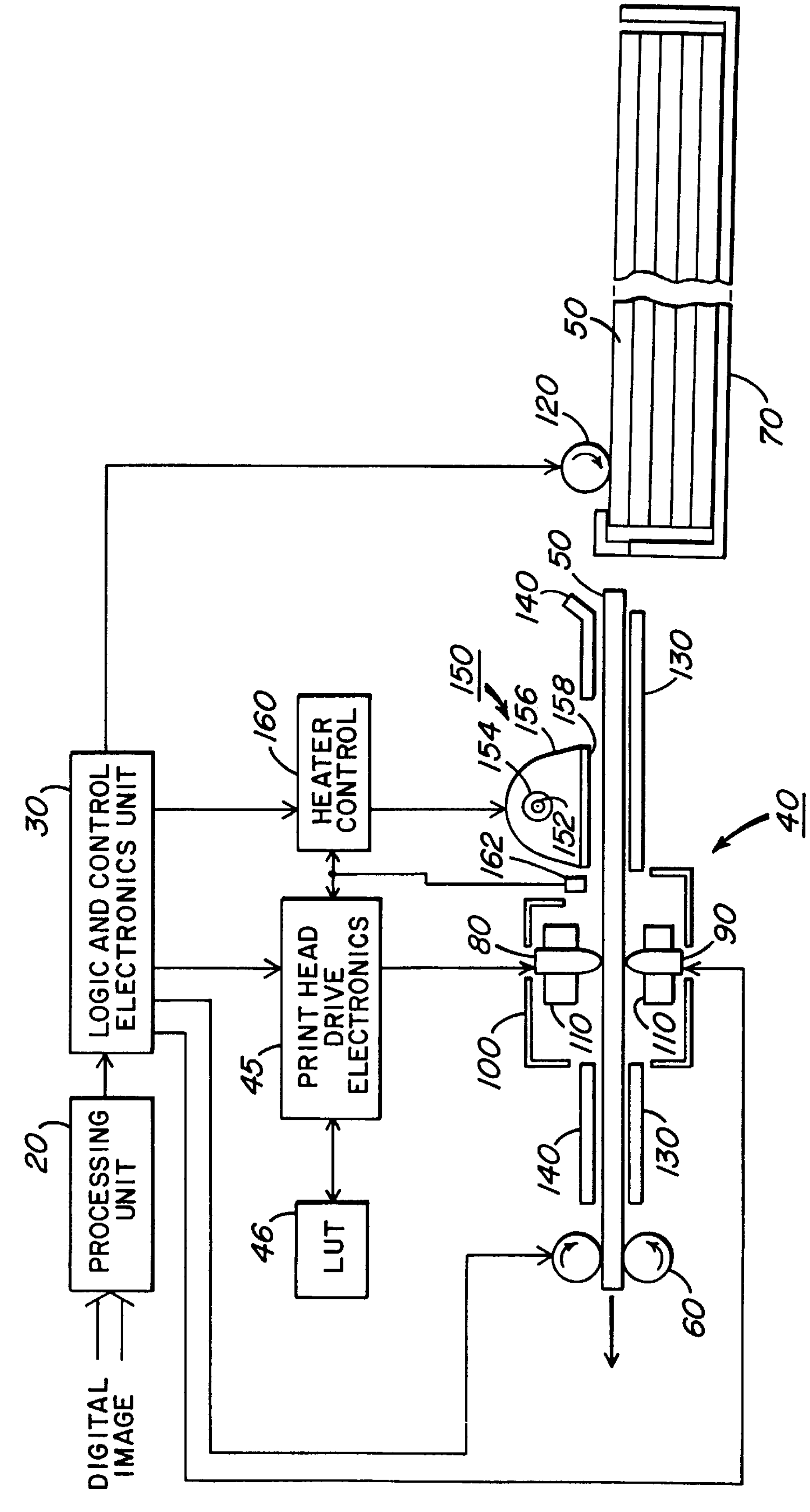
FIG. 1 shows the electronic printing apparatus in accordance to the present invention.

FIG. 1 shows the electronic printing apparatus 10 in accordance to the present invention. The electronic printing apparatus 10 includes a processing unit 20, a logic and control electronics unit 30, a print head 40, print head drive electronics 45, calibration look-up table 46, a receiver 50 that comprises field-driven particles in a matrix (see FIG. 3), a receiver transport 60, and a receptacle 70. The print head 40 includes an array of pairs of top electrodes 80 and bottom electrodes 90 (only one pair being shown) corresponding to each pixel of the image forming position on the receiver 50. The receiver is used as a non-emissive display in a reflective or transmissive mode. The array of electrodes is contained in an electrode structure 110. The electrode structure 110 is formed using polystyrene as an insulating material. It is known that other insulating materials including ceramics and plastics can be used. An electric voltage is applied by logic and control electronics unit 30 across the pair of electrodes at each pixel location to produce the desired optical density at that pixel. An electrically grounded shield 100 is provided to shield print head 40 from external electric fields.

The receiver 50 is shown to be picked by a retard roller 120 from the receptacle 70. Other receiver feed mechanisms are also compatible with the present invention: for example, the receiver can be fed by single sheet or by a receiver roll equipped with cutter. The term "receptacle" will be understood to mean a device for receiving one or more receivers including a receiver tray, a receiver roll holder, a single sheet feed slot etc. During the printing process, the receiver 50 is supported by the platen 130 and guided by the guiding plate 140, and is transported by the receiver transport mechanism 60.

The electronic printing apparatus 10 in FIG. 1 is shown to further include a heater 150 and a heater control circuit 160. The heater 150 includes a heating element 152, a tube 154, a reflector 156 and a cover 158. The heater 150 is controlled by the heater control circuit 160 for providing thermal energy to receiver 50 before and/or during an electric field is applied to an area on the receiver 50 by electrodes 80 and 90. The purpose of the heater 150 is to increase the mobility of the field-driven particles 200 (FIG. 3) by increasing the temperature in the matrix 230 in the receiver 50 (FIG. 3). As it is well known in the art, the viscosities of the most common fluids comprising low molecular weight molecule or polymers decrease as the temperature increases (see for example, CRC Handbook of Chemistry and Physics edited by David R. Lide, CRC Press, Boca Raton). The mobility of colloidal particles driven by an external field is inversely proportional to the viscosity of the fluid the particles are immersed in. Thus decreased viscosity in the fluid 210 increases the mobility of the field-driven particles 200 in the electric field (FIG. 3). After the electric field is applied to the field-driven particles at each pixel, the field-driven particles are away from the heater and the temperature decreases. The viscosity of the fluid increases and the mobility of the field-driven particles are reduced. The spatial and orientational configuration of the field-driven particles are fixed for a stable display image.

The heater 150 in FIG. 1 is shown to be a radiant heater in which the heating element 152 can be a coiled electrically resistive wire and the tube 154 can be made of quartz. The heating element 152 is surrounded by the tube 154 for protecting the heating element 152 from damage. The tube 154 also provides physical support to the entire length of the heating element 152. In addition, the tube 154 electrically insulates the heating element 154 from the surroundings and protects the heating element 152 from damaging other components in the heater 150. The material selected for heating element 152 and tube 154 should possess durability at high temperature through a multiplicity of thermal cycles. Examples of such materials as suitable for use heating element 152 are "NICHROME", a Nickel-Chromium Alloy, and iron chromium aluminum alloys. "NICHROME" is a trademark of Driver-Harris Company located in Harrison, N.J. Tube 154 may be quartz. It is appreciated by a person of ordinary skill in the art that metal sheathed heating elements or exposed wire heaters may also be used. Electrical current flowing through heating element 152 causes heating element 152 to heat, thereby generating radiant heat emanating therefrom.

Although a radiant heater is described above in relation to FIG. 1, it is understood that many other heater types are compatible with the present invention. For example, the heater can include contact type, a convection type etc.

The heating element 152 and the tube 154 in the heater 150 are shown to be housed in a reflector 156 that is made of a substantially reflective material, such as polished aluminum, partially surrounds tube 154. The reflector 156 is preferably parabolic-shaped and is arranged so as to reflect the radiant heat energy onto to receiver 50. The reflector 156 preferably reflects the heat at a high thermal efficiency ratio. As used herein, the terminology "thermal efficiency ratio" is defined to mean the quantity of heat energy reaching receiver 50 divided by the quantity of total heat energy emitted by heating element 152.

The cover 158 is a substantially heat transparent. It is disposed across the open side of the reflector 156. The cover 158 may be a metal screen or sheet metal with punched holes for preventing receiver 50 from inadvertently contacting tube 154 while simultaneously allowing a sufficient quantity of radiant heat flux to pass through. A sensor 162 which senses the temperature adjacent to the receiver 50 in the image forming position, provides a signal to the heater control circuit 160 representative of the temperature of the receiver 50. A typical temperature range sensed by the sensor 162 is 30° C. to 100° C. The heater control circuit 160 adjusts the amount of the electric power applied by the heater 150, which determines the thermal energy applied to the receiver 50. The logic and control electronics unit 30 responds to the processing unit 20 and turns on the heat control circuit 160 before the processing unit delivers image data to the logic and control electronics units 30 for application to top electrodes 80. Before the logic and control electronics unit 30 delivers data to the electrodes 80 and 90, the temperature sensed by sensor 162 reaches a sufficient level indicating that the mobility of the field-driven particles in the matrix of the receiver 50 is high enough for efficient printing.

The logic and control electronics unit 30 controls the amount of the heat applied to the receiver 50 via heater control 120. The logic and control electronics unit 30 also controls the pick-up of the receiver by retard roller 120 as well as the transport of the receiver by receiver transport 60. The receiver temperature and receiver transport velocity are optimized for best display image quality.

The digital image is input to processing unit which performs the commonly known image processing operations such as tone scale calibration, color transfer, halftoning etc. The processed pixel data are sent to the print head drive electronics 45. The print head drive electronics 45 subsequently generates electric voltage signals of proper waveforms for each image pixel on the receiver 50 according to the calibration look-up table 46 and the temperature detected by the sensor 162. Details of the generation of these voltage waveforms will be described below.

Figure 2:
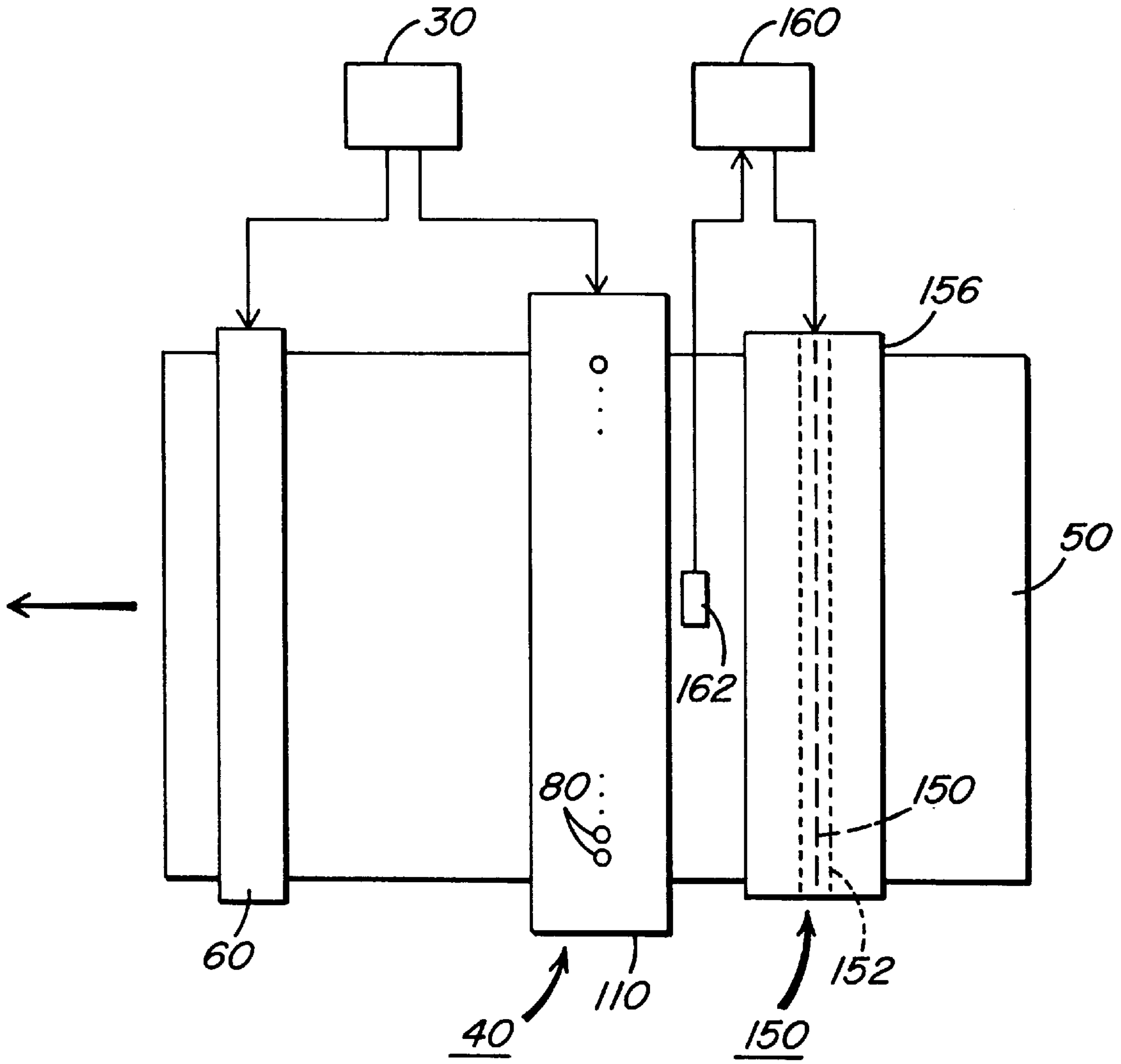
FIG. 2 shows a top view of the structure around the print head 40 of FIG. 1.

FIG. 2 shows a top view of the structure around the print head 40. For clarity reasons, only selected components are shown. The receiver 50 is shown to be transported under the print head 40 by the receiver transport mechanism 60. The print head 40 is shown to include a plurality of top electrodes 80, each corresponding to one pixel. The top electrodes 80 are located within holes in the electrode structure 110. The bottom electrodes 90 of FIG. 1 are also disposed in an electrode structure 110. The electrodes are distributed in a linear fashion as shown in FIG. 2 to minimize electric field fringing effects between adjacent pixels printed on the receiver 50. Different printing resolutions are achievable across the receiver 50 by the different arrangements of the top electrodes 80, including different electrode spacing. The printing resolution down the receiver 50 can also be changed by controlling the receiver transport speed by the receiver transport mechanism 60 or the rate of printing by controlling the logic and control electronics unit 30. The heater 150, that is controlled by heater control circuit 160, is shown upstream to the print head 40. The heating element 152 and the tube 154 are also shown.

Figure 3A:
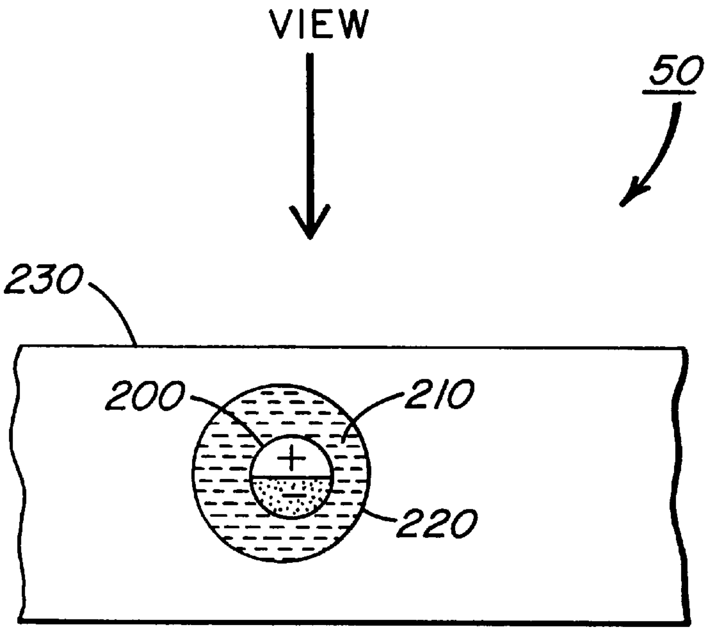
FIGS. 3*a* and 3*b* show a cross sectional view of the receiver 50 of FIG. 1.
Figure 3B:
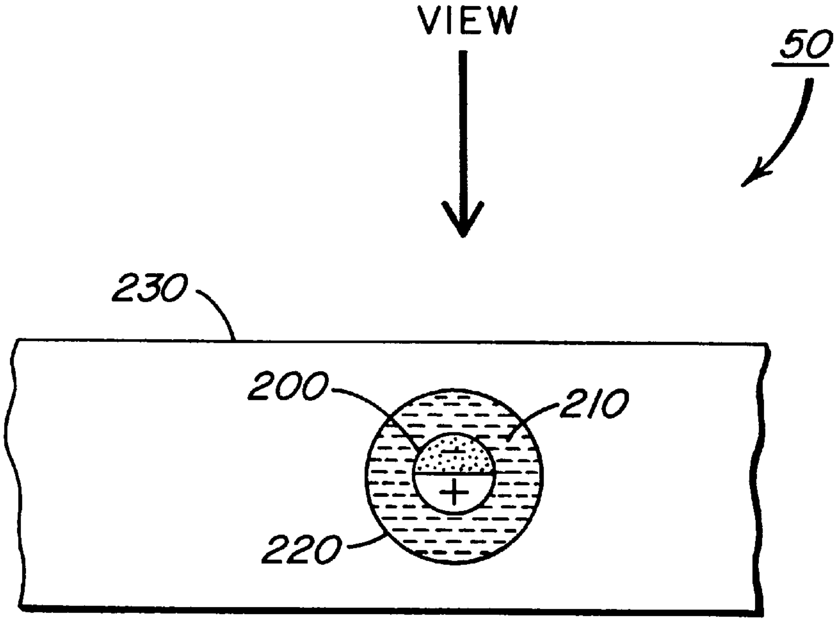
Figure 4A:
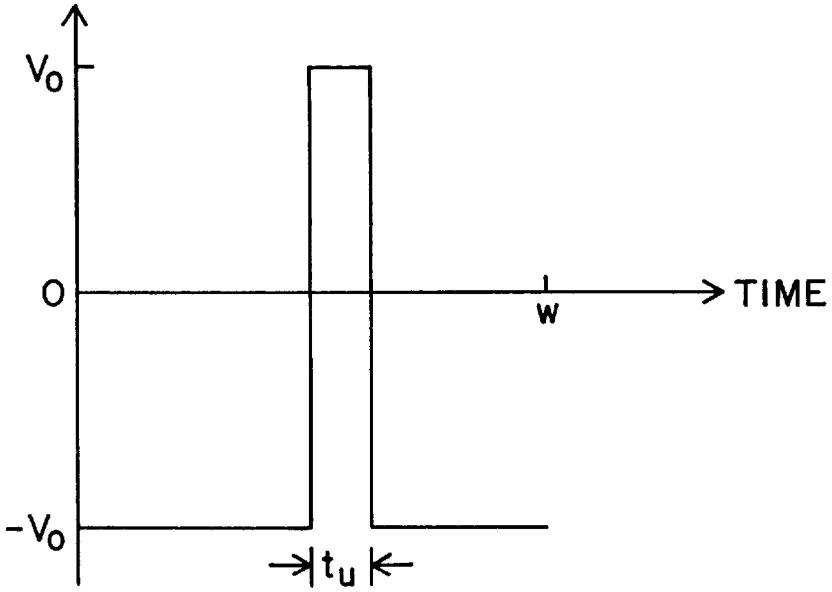
FIGS. 4*a–d* illustrate the modulation of the duration of the electric voltage applied to the field-driven particles.
Figure 4B:
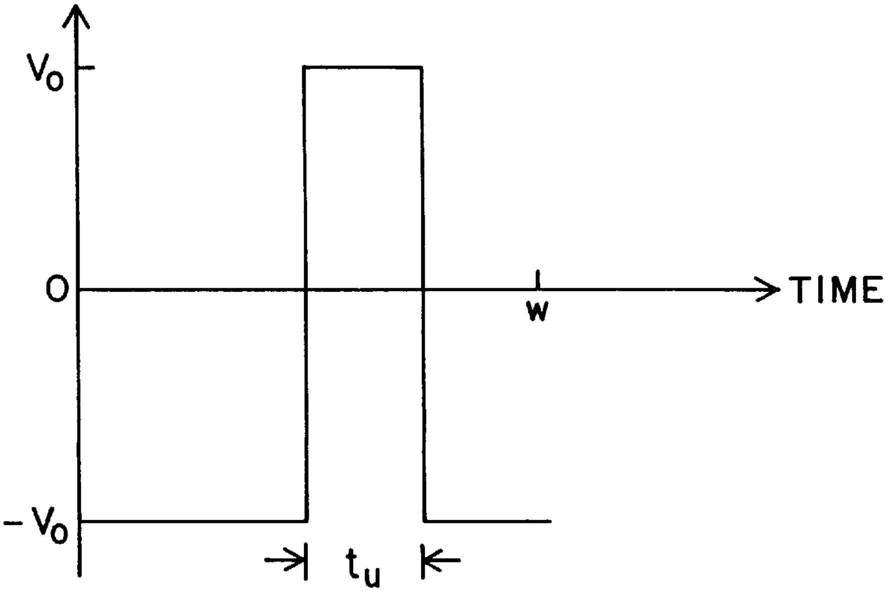
Figure 4C:
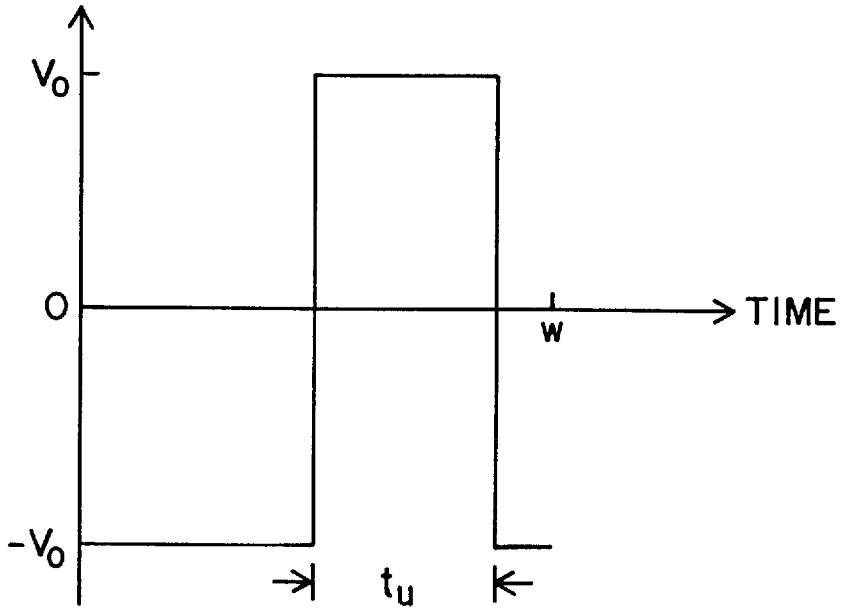
Figure 4D:
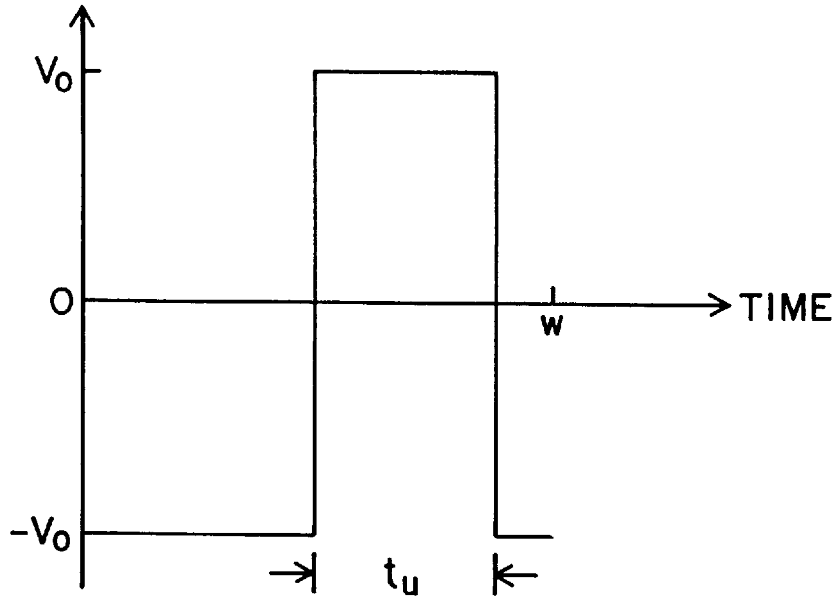

FIGS. 3*a* and 3*b* show a cross sectional view of the receiver 50 of FIG. 1. The receiver 50 is shown to comprise a plurality of field-driven particles 200. The field-driven particles 200 are exemplified by bi-chromatic particles, that is, half of the particle is white and the other half is of a different color density such as black, yellow, magenta, cyan, red, green, blue, etc. The bi-chromatic particles are electrically bi-polar. Each of the color surfaces (e.g. white and black) is aligned with one pole of the dipole direction. The stable field-driven particles 200 are suspended in a fluid 210 which are together encapsulated in a microcapsule 220. The materials for fluid 210 can be oil and are also disclosed in the prior art below. The microcapsules 220 are distributed in matrix 230. An electric field induced in the microcapsule 220 align the field-driven particles 200 to a low energy direction in which the dipole opposes the electric field. When the field is removed the particles state remains unchanged. FIG. 3*a* shows the particle 200 in the white state as a result of field previously imposed by a negative top electrode 80 of FIG. 1 and positive bottom electrode 90 of FIG. 1. FIG. 3*b* shows the particle 200 in the black state as a result of field previously imposed by a positive top electrode 80 of FIG. 1 and negative bottom electrode 90 of FIG. 1. In the following discussion, this state is referred as the "up" state. The time $t_u$ is the duration or the width of the electric voltage pulse applied to the field-driven particles to produce the up state.

The field-driven particles can include many different types, for example, the bi-chromatic dipolar particles and electrophoretic particles. In this regard, the following disclosures are herein incorporated in the present invention. Details of the fabrication of the bi-chromatic dipolar particles and their addressing configuration are disclosed in U.S. Pat. Nos. 4,143,103; 5,344,594; and 5,604,027; and in "A Newly Developed Electrical Twisting Ball Reflective receiver" by Saitoh et al p249–253, Proceedings of the SID, Vol. 23/4, 1982, the disclosure of these references are incorporated herein by reference. Another type of field-driven particle is disclosed in PCT Patent Application WO 97/04398. It is understood that the present invention is compatible with many other types of field-driven particles that can display different color densities under the influence of an electrically activated field.

Figure 5:
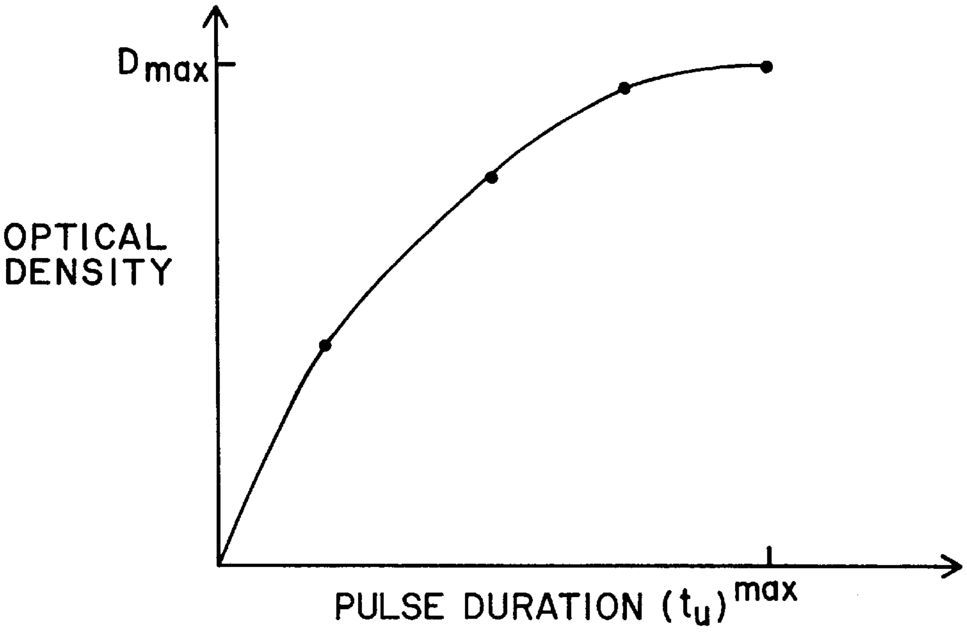
FIG. 5 shows the dependence of the optical density provided by the field-driven particles on the duration of the electric voltage applied to the field-driven particles.

FIGS. 4*a–d* illustrate the first embodiment of the present invention for providing display image with continuous tone optical densities. A time duration "w" is spent on writing of each line of pixels. The peak voltages applied to the field-driven particles are "$+V_0$" corresponding to the "up" state (maximum density) and "$-V_0$" corresponding to the white state (minimum density). A negative voltage is applied to the field-driven particles at the beginning of each writing operation to produce an initial white state so that the writing of the new image information is independent from the last image on the receiver 50. The negative voltage is then followed by a pulse of positive voltage at "$+V_0$". The positive voltage pulse has the effect of inducing the field-driven particles toward an "up" (and maximum density) state. For the bi-chromatic particles, the field provided by the positive voltage rotates the particles from the configuration shown in FIG. 3*a* to the configuration shown in FIG. 3*b*. The degree of the rotation is dependent on the duration of the positive voltage pulse. For the electrophoretic particles, the field provided by the positive voltage moves the particles toward the view direction to produce high optical density. The degree of the translation of the electrophoretic particles is controlled by the duration of the positive voltage pulse. FIGS. 4(*a*) to (*d*) show the positive voltage pulses with increased duration, which produces increased optical densities at the image pixel. The dependence of optical density on the duration of the positive voltage pulse is shown in FIG. 5.

Figure 7:
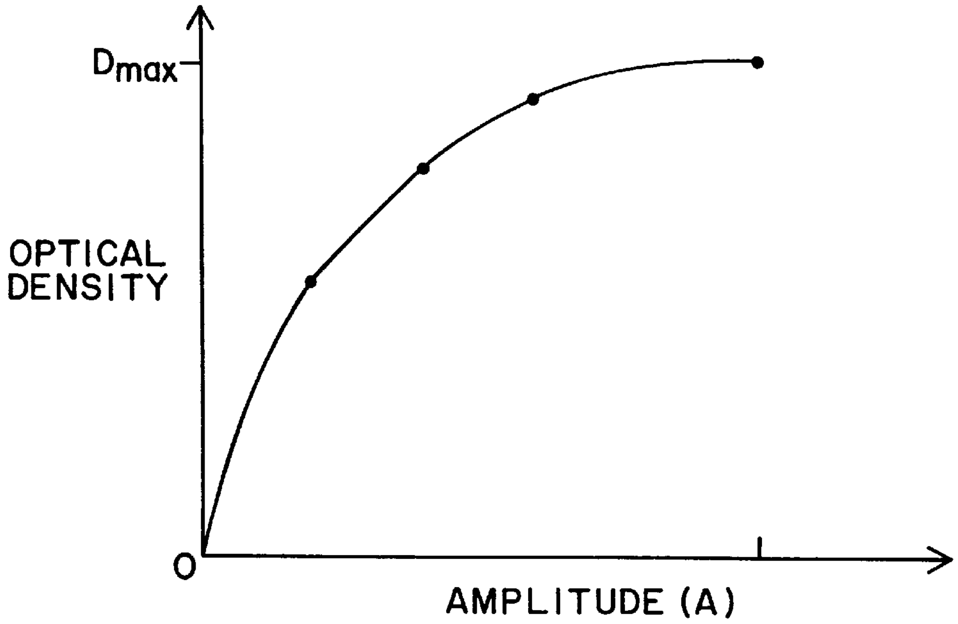
FIG. 7 shows the dependence of the optical density provided by the field-driven particles on the amplitude of the electric voltage applied to the field-driven particles.
Figure 6A:
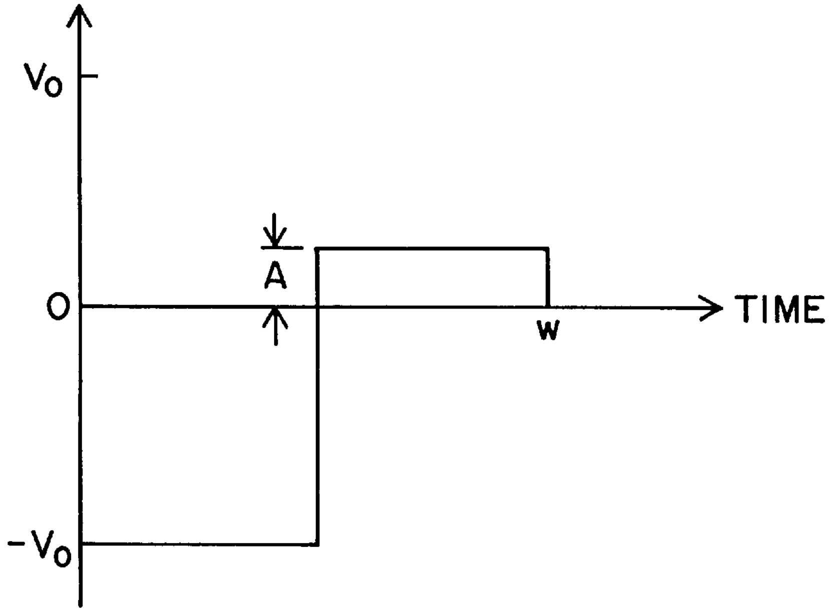
FIGS. 6*a–d* illustrate the modulation of the amplitude of the electric voltage applied to the field-driven particles.
Figure 6B:
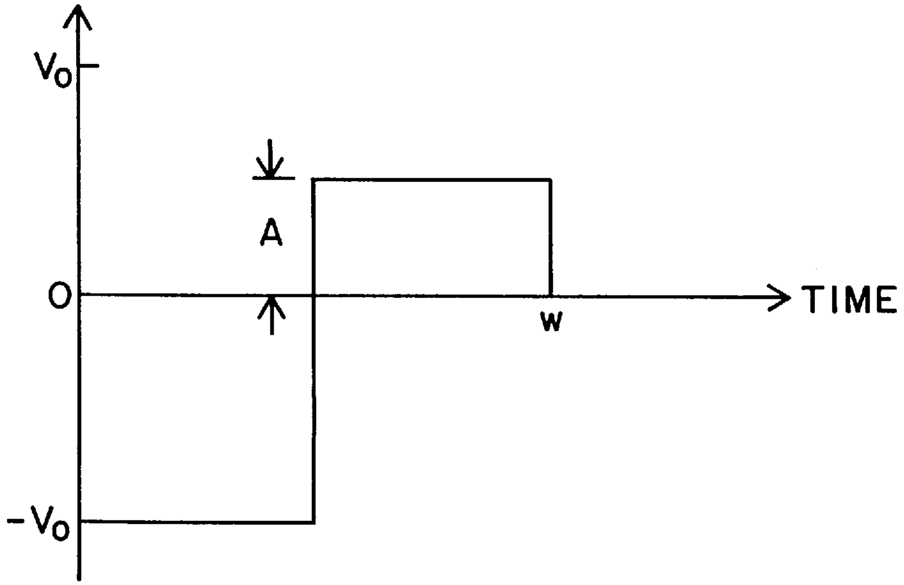
Figure 6C:
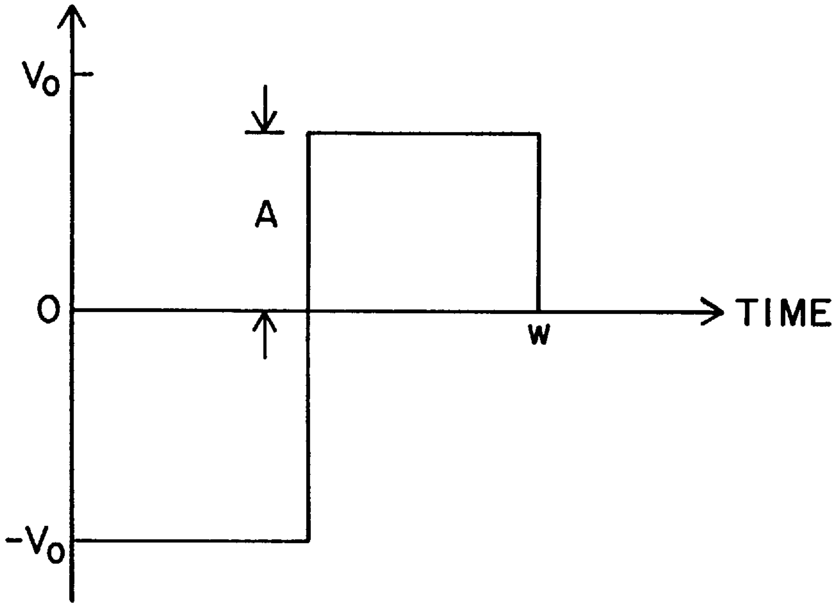
Figure 6D:
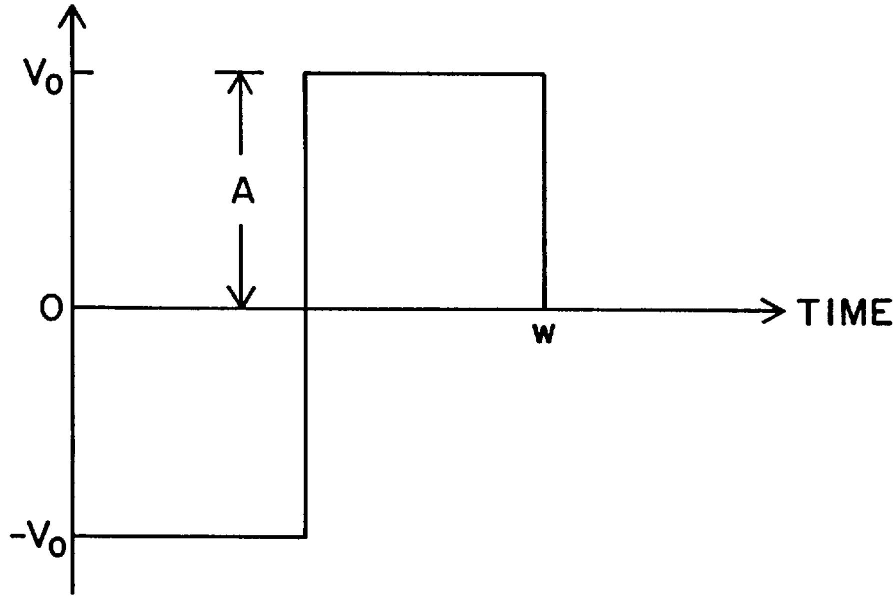

FIGS. 6*a–d* illustrate the second embodiment of the present invention for providing display image with continuous tone optical densities. A time duration "w is spent on writing of each line of pixels. In each writing line time, a negative voltage is first applied to the field-driven particles at the to produce an initial white state so that the writing of the new image information is independent from the last displayed image on the receiver 50. The negative voltage is then followed by a positive voltage pulse which has a fixed duration. The positive voltage pulse has the effect of inducing the field-driven particles toward an "up" (and maximum density) state. For the bi-chromatic particles, the field provided by the positive voltage rotates the particles from the configuration shown in FIG. 3*a* to the configuration shown in FIG. 3*b*. The degree of the rotation is dependent on the amplitude of the positive voltage pulse. For the electrophoretic particles, the field provided by the positive voltage moves the particles toward to away from the view direction to produce high optical density. The degree of the translation of the electrophoretic particles is controlled by the amplitude of the positive voltage pulse. FIGS. 6(*a*) to (*d*) show the positive voltage pulses with increased amplitude, which produces increased optical densities at the image pixel. The dependence of optical density on the amplitude of the positive voltage pulse is shown in FIG. 7.

In a third embodiment of the present invention, the first and the second embodiments of the present invention can be combined. The positive voltage pulses can be modulated in both duration and the amplitudes to produce variable optical densities in the image pixels. By use of the term "modulate", it is meant that the area of the voltage waveform (its amplitude and duration) can be changed to provide a desired electric field. The voltage waveforms can include continuous or discrete pulses of square wave shape or of any desired shape which produces appropriate continuous tone pixel.

It is understood that the present invention is only illustrated by the electronic printing apparatus 10 as shown in FIG. 1. The modulation of voltages applied to the field-driven particles in accordance with the present invention is not limited to the specific configuration of the electronic printing apparatus 10 as shown in FIG. 1. For example, electrodes and addressing circuitry can be provided inside the receiver 50 on which the image is displayed.

FIG. 8 presents a representation of a calibration look-up table 46. Calibration look-up table 46 contains the optimized pulse duration Tu(i,j) and amplitude A(i, j) settings (for ith temperature and jth optical density value) required to produced a variety of optical densities $D_1, D_2 \ldots D_N$ at different temperatures $T_1, T_2 \ldots T_N$ as detected by sensor 162. This table is established by a calibration of the printer. It is understood however that this calibration could be accomplished at various times without affecting the invention.

Referring to FIG. 1, a typical operation of the electronic printing apparatus 10 is described in the following. A user sends a digital image to processing unit 20. Processing unit 20 receives the digital image storing it in internal storage. All processes are controlled by processing unit 20 via logic and control electronics unit 30. A receiver 50 is picked from receptacle 70 by retard roller 120, which is controlled by logic and control electronics unit 30. The receiver 50 is advanced until the leading edge engages receiver transport 60. Retard roller 120 produces a retard tension against receiver transport 60 which controls receiver 50 motion. The receiver 50 is heated by heater 150 before or concurrent with writing an image area by print head 40. The amount of the heating power is controlled by heater control circuit 160 and which further controlled by the logic and control electronics unit 30. The heater applies thermal energy to the receiver 50 and raises the temperature of the fluid 210 in the microcapsule 220 (FIG. 3), which decreases the viscosity of the fluid 210. The decreased viscosity in fluid 210 increases the mobility of the field-driven particles 200. The increased mobility of the field-driven particles 200 decreases the response time of the field-driven particles 200 when an image area on the receiver 50 is applied with an electric field by the print head 40 as described previously and below.

The logic and control electronics unit 30 is in communication with the heater control circuit 160. The heating power of the heater 150, the writing time of the print head 40, and the electric voltage across the top electrode 80 and the bottom electrode 90 can be optimized for the most desired image quality and printing productivity of the electronic printing apparatus 10.

The digital image is input to the processing unit 20 in which the digital image is processed, as described above. The processed pixel data are sent to the print head drive electronics 45. The print head drive electronics 45 communicates with the calibration look-up table 46 and the sensor 162 and generates electric voltage signals of proper waveforms by modulating the duration or the amplitude of the voltage signals. As the receiver 50 is moved past the image forming position between the array of pair of electrodes, the proper voltage waveforms are sent to the pair of the top and the bottom electrodes 80 and 90 print head 40 for producing the image pixels on the receiver 50. The electrodes generate an electric field which is applied to the receiver. Each pair of electrodes is driven in a complementary fashion, bottom electrode 90 presents a voltage of opposite polarity to the voltage produced by top electrode 80, each voltage referred to as ground. Each pixel location is driven according to the input digital image to produce the desired optical density. The optical densities are varied according to the input digital image by modulating the duration and/or the amplitude of the voltage applied to the electrodes as determined by the print head drive electronics 45 from the calibration look-up table 46. The pixel data is selected from the digital image data to adjust for the relative location of each electrode pair and transport motion. The receiver transport 60 advances the receiver 50 a displacement which corresponds to a pixel pitch. The next set of pixels are written according to the current position. The process is repeated until the entire image is written. The retard roller 120 disengages as the process continues and the receiver transport 60 continues to control receiver 50 motion. The receiver transport 60 moves the receiver 50 out of the electronic printing apparatus 10 to eject the print. The receiver transport 60 and the retard roller 120 are close to the image forming position under the electrodes 80 and 90, this improves control over the receiver motion and improves print quality.

After an image is written by the print head 40, the fluid 210 in the microcapsule 220 is cooled down and the mobility of the field-driven particles 200 is reduced, which helps to stabilize the image on the receiver 50.

The invention has been described in detail with particular reference to certain preferred embodiments thereof, but it will be understood that variations and modifications can be effected within the spirit and scope of the invention.

PARTS LIST

| | |
|---|---|
| 10 | electronic printing apparatus |
| 20 | processing unit |
| 30 | logic and control electronics unit |
| 40 | print head |
| 45 | print head drive electronics |
| 46 | calibration look-up table |
| 50 | receiver |
| 60 | receiver transport |
| 70 | receptacle |
| 80 | top electrode |
| 90 | bottom electrode |
| 100 | electrically grounded shield |
| 110 | electrode structure |
| 120 | retard roller |
| 130 | platen |
| 140 | guiding plate |
| 141 | heater |
| 152 | heating element |
| 154 | tube |
| 156 | reflector |
| 158 | cover |
| 160 | heater control circuit |
| 162 | sensor |
| 200 | field-driven particle |
| 210 | fluid |
| 220 | microcapsule |
| 230 | matrix |

What is claimed is:

1. An electronic printing apparatus responsive to a digital image for providing image pixels of continuous tone optical density in an output image on a receiver, comprising:
   a) a receiver including field-driven particles in a matrix, the field-driven particles being responsive to applied electric fields of different amplitude and duration to change the optical density on the receiver;
   b) an array of electrodes associated with the receiver for selectively applying electric fields according to the digital image to form image pixels across the receiver; and
   c) electronic control means coupled to the array and responsive to the digital images for computing properly modulated voltage waveforms by selecting amplitudes and durations of voltage pulses applied to the electrode array so that, when the voltage waveforms are applied to the array, fields are produced by the array and applied to the receiver to provide continuous tone pixels having optical densities corresponding to the digital image.

2. The electronic printing apparatus of claim 1 wherein the electronic control means further includes a look-up table responsive to the digital image to provide output signals and means responsive to such output signals to produce appropriate voltage waveforms to provide the continuous tone image pixels on the receiver.

3. An electronic printing apparatus responsive to a digital image for providing image pixels of continuous tone optical density in an output image on a receiver, comprising:
   a) a receiver including field-driven particles in a matrix, the field-driven particles being responsive to applied electric fields of different amplitude and duration to change the optical density on the receiver;
   b) an array of electrodes associated with the receiver for selectively applying electric fields according to the digital image to form image pixels across the receiver;
   c) a heater for heating the receiver to increase the temperature of the matrix so as to increase the mobility of the field-driven particles in the matrix;

d) means for sensing the temperature of the receiver; and e) electronic control means coupled to the array and responsive to the digital images and the receiver temperature for computing voltage waveforms having amplitudes and durations selected so that, when the voltage array forms are applied to the array, fields are produced by the array and applied to the receiver to provide continuous tone pixels having optical densities corresponding to the digital image.

4. The electronic printing apparatus of claim 3 wherein the electronic control means further includes a look-up table responsive to the digital image and the temperature sensing means to provide output signals and means responsive to such output signals to produce appropriate voltage waveforms having amplitudes and durations to provide the continuous tone pixels.

5. The electronic printing apparatus of claim 4 further including means for controlling the heater so that the receiver is at one of a plurality of temperature ranges and the look-up table being responsive to the temperature of the receiver sensed by the temperature sensing means and the input signal for producing the output signals.

* * * * *